Aug. 7, 1945. B. D. HORTH 2,381,540
SIDE MILLING CUTTER
Filed Oct. 9, 1943
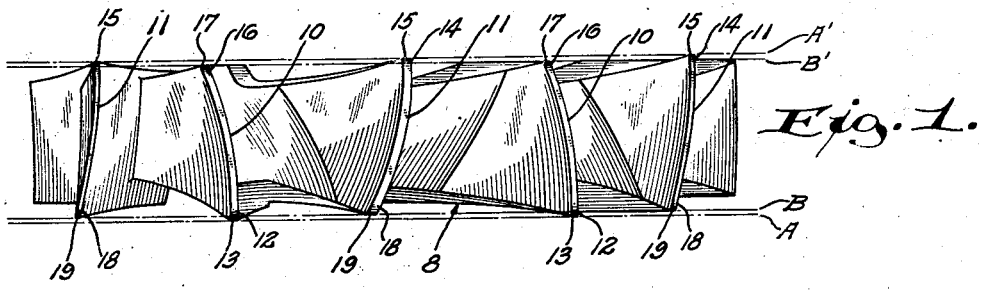
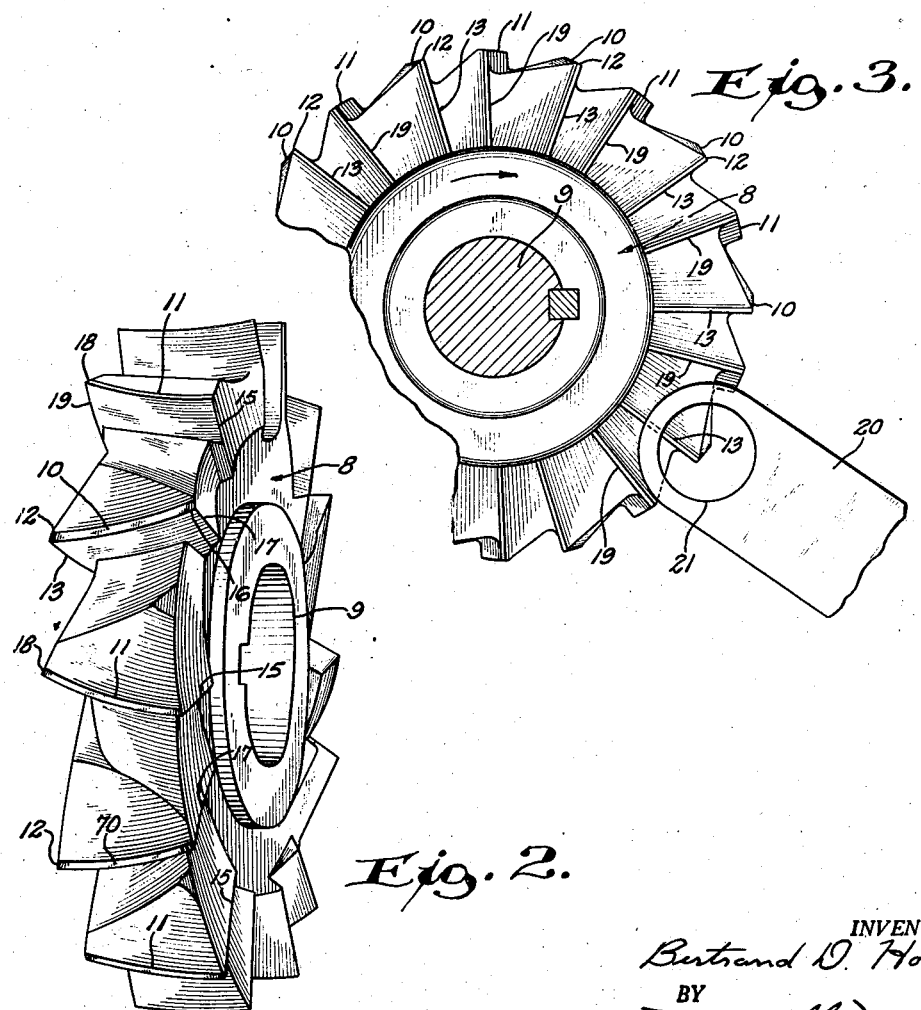
Fig. 1.
Fig. 3.
Fig. 2.
INVENTOR.
Bertrand D. Horth
BY
Morsell & Morsell
ATTORNEYS.

Patented Aug. 7, 1945

2,381,540

UNITED STATES PATENT OFFICE 2,381,540

SIDE MILLING CUTTER

Bertrand D. Horth, Waterford, Wis., assignor to Aber Engineering Works Incorporated, Waterford, Wis., a corporation of Wisconsin Application October 9, 1943, Serial No. 505,614

1 Claim. (Cl. 29—103)

This invention relates to improvements in side milling cutters.

Side milling cutters as commonly manufactured have cutting edges on both sides of the cutter which meet ends of transverse peripheral cutting teeth. On staggered tooth side milling cutters, because of the alternate right- and left-hand spiral angles of the peripheral teeth, there is a side cutting edge on one side of each peripheral tooth only. This side cutting edge meets the leading corner of the peripheral cutting edge and there is no corresponding side cutting edge meeting the opposite corner of the peripheral tooth. Thus, on each side of the cutter there are only half as many side cutting edges as there are peripheral teeth. Furthermore, the side cutting edges on one side are positioned alternately from the side cutting edges on the opposite side. As a result, when this type of cutter is fed into work which is of less width than the spacing between the side cutting edges, or, which more frequently occurs, when the cutter is fed into the work so that it has to pass a transverse hole, the normally widely spaced side cutting edges have too much of a gap therebetween, causing the cutter to jump. This places a considerable strain on the corners of the peripheral teeth and sometimes these corners are broken off. It has heretofore been considered impractical to have side cutting teeth meeting each corner of the peripheral tooth of a staggered tooth side milling cutter because there would be too much friction and drag and there would be insufficient room for the chips to clear, it being understood that the chips are being pushed from the leading corner of the peripheral cutting tooth along the angle to the opposite corner thereof. It was heretofore considered undesirable to have a side cutting edge meeting this opposite corner where the chips normally emerge.

It is a general object of the present invention to provide an improved staggered tooth side milling cutter which is so constructed as to make it practical to have side cutting edges joining each corner of a peripheeral cutting tooth.

A further object of the invention is to provide a construction as above described which enables the peripheral cutting teeth to be of greater length than usual.

A more specific object of the present invention is to provide a construction as above described wherein the side cutting edge which joins the leading corner of a peripheral cutting tooth projects laterally a greater distance than the side cutting edge which joins the opposite corner of the peripheral tooth, thereby making it practical to utilize side cutting edges which meet both corners of a peripheral tooth.

With the above and other objects in view the invention consists of the improvements in side milling cutters and all its parts and combinations as set forth in the claims and all equivalents thereof.

In the accompanying drawing illustrating one complete embodiment of the preferred form of the invention, illustrating by way of example a staggered tooth side milling cutter wherein the peripheral teeth are curved, as disclosed in my pending application Serial No. 445,172, filed May 30, 1942, now Patent No. 2,344,954, issued March 28, 1944, in which the same reference numerals designate the same parts in all of the views:

Fig. 1 is a peripheral view of a cutter embodying the improvements of the present invention, the difference in the amount of lateral projection of one tooth with respect to an adjacent tooth being somewhat exaggerated to more clearly bring out the features of the present invention;

Fig. 2 is a perspective view of the improved cutter; and

Fig. 3 is a side view of the cutter showing it partially fed into a piece of work, part of the cutter being broken away.

Referring more particularly to the drawing the improved cutter is formed of any suitable metal or alloy and comprises a circular blank 8 having a center opening 9 and having peripheral teeth or cutting edges 10 which angle generally in a left-hand direction, looking at Fig. 1, and alternating peripheral teeth or cutting edges 11 which angle generally in a right-hand direction, referring to Fig. 1. In the adaptation of the invention shown, the edges 10 and 11 are curved. The invention, however, is equally applicable to staggered tooth side milling cutters having straight angles edges.

The leading ends or corners 12 of the peripheral cutting edges 10 project laterally beyond the face of the blank and meet side cutting edges 13. For purposes of illustration the amount of lateral projection of the side cutting edges is indicated by the dot and dash line A in Fig. 1. On the opposite side of the cutter the leading corners 14 of the peripheral cutting edges 11 meet with side cutting edges 15. The amount of lateral projection of the side cutting edges 15 is indicated in Fig. 1 by the dot and dash line A' and this is equal to the amount of lateral projection indicated by the dot and dash line A on the first mentioned side of the cutter.

Referring now to the receding corner 16 of each peripheral cutting edge 10 this corner, in customary practice, does not project beyond the face of the cutter. With the present invention, however, the receding corner 16 projects laterally and joins a side cutting edge 17. The amount of lateral projections of the side cutting edges 17 is indicated for purposes of illustration by the dot and dash line B' in Fig. 1. Actually, however, the distance between the lines A' and B' is between .001 of an inch and .0025 of an inch. The exact amount of difference between the imaginary lines A' and B' is not critical and is a minor amount. It will vary somewhat with the size of the cutter. It is, however, essential that there be a difference and that the corners 14 and cutting edges 15 project laterally a greater distance than the corners 16 and cutting edges 17.

Similarly on the other side of the cutter the receding corners 18 of the peripheral cutting teeth 11 also project beyond the face of the cutter and join with side cutting edges 19. The amount of lateral projection of the side cutting edges 19 is indicated, for purposes of illustration, by the dot and dash line B. The distance between the lines A and B on one side is equal to the distance between the lines A' and B' on the opposite side and actually the distance between the lines A and B is between .001 of an inch and .0025 of an inch.

From the above it is apparent that on each side of the cutter there are the same number of side cutting edges as there are peripheral cutting teeth, whereas in standard practice there are only half as many side cutting edges. It is also apparent that on each side every other side cutting edge projects laterally a slight distance farther than the next adjacent side cutting edge.

Referring now to Fig. 3 there is indicated a piece of work 20 having a transverse hole 21. The cutter 8 is shown as partially fed into the work for the purpose of producing a bifurcated end. The ordinary staggered tooth side milling cutter would have none of the side cutting edges 19; therefore, in certain positions of rotation there would be no side cutting edge on the viewed side of the cutter in engagement with the work. As a result the cutter would jump and produce strains on the corners of the peripheral cutting teeth. Furthermore, even if the work were considerably wider than illustrated in Fig. 3, the hole 21, which must be intersected by the cutter, is of less diameter than the spacing between the side cutting edges 13; therefore, if there were no side cutting edges 19 in between the side cutting edges 13, the cutter would be inclined to jump as it intersects the hole 21. With the present invention, however, there is always a side cutting edge on each side in contact with the hole 21 and in contact with the work. If these extra side cutting edges 19 projected laterally the same distance as the side cutting edges 13, there would be too much friction and drag and insufficient clearance for the chips which are pushed along the peripheral cutting edges toward the sides. With the present invention, however, due to the fact that one side cutting edge projects slightly farther laterally than the next adjacent side cutting edge, the chips are pushed from the leading corner of a peripheral cutting edge toward the receding corner to within .001 of an inch or so of the side wall of the groove which is being milled. This allows enough relief to prevent friction and drag. On the other hand, by having the extra side cutting edges 19 on one side and 17 on the opposite side, there is always at least one side cutting edge on each side in substantial engagement with the side wall of the groove. The shorter cutting edge enables the receding ends of the peripheral teeth to be extended out farther than normally so that almost all of the width of the stock can be cut. The slight amount left will then be cut by the next full length tooth with a minimum of effort or strain. Thus a two-stage cutting takes place in the action of the side cutting edges.

While the invention finds its greatest utility in a staggered tooth side milling cutter, either of the standard spiral type or of the curved tooth type illustrated, nevertheless the invention is also suitable for use in connection with non-staggered side milling cutters.

Various other changes and modifications may be made without departing from the spirit of the invention and all of such changes are contemplated as may come within the scope of the claim.

What I claim is:

A circular milling cutter having cutting teeth on its periphery, cutting edges of said peripheral teeth being arcs, the arc of every other tooth being the arc of a circle whose center is positioned nearer to one side of the cutter than to the other, and the arc of each alternating tooth being the arc of a circle whose center is positioned nearer to the opposite side of the cutter so as to provide relatively flat arcs at the leading ends of the cutting edges, there also being a side cutting edge joining each end of each peripheral tooth and projecting laterally from the side of the cutter, the side cutting edge which joins the leading end of a peripheral tooth projecting slightly farther laterally than the side cutting edge which joins the opposite end and those cutting edges which project the farther alternating on each side of the cutter with those which project the lesser distance.

BERTRAND D. HORTH.